United States Patent [19]

Westerhaus et al.

[11] Patent Number: 4,966,641
[45] Date of Patent: Oct. 30, 1990

[54] COLOR INTENSIVE IRON OXIDE BLACK PIGMENTS OBTAINED BY THE NITROBENZENE REDUCTION PROCESS AND A PROCESS FOR ITS PREPARATION

[75] Inventors: Axel Westerhaus; Karl-Werner Ganter; Gunter Buxbaum, all of Krefeld, Fed. Rep. of Germany

[73] Assignee: Bayer Aktiengesellschaft, Leverkusen-Bayerwerk, Fed. Rep. of Germany

[21] Appl. No.: 281,912

[22] Filed: Dec. 7, 1988

Related U.S. Application Data

[63] Continuation of Ser. No. 59,492, Jun. 8, 1987, abandoned.

[30] Foreign Application Priority Data

Jun. 18, 1986 [DE] Fed. Rep. of Germany ....... 3620333

[51] Int. Cl.$^5$ ............................................. C09C 1/24
[52] U.S. Cl. ..................................... 106/456; 106/460
[58] Field of Search ............................... 106/456, 460

[56] References Cited

U.S. PATENT DOCUMENTS

| 4,358,431 | 11/1982 | Brunn et al. ........................ 106/456 |
| 4,491,619 | 1/1985 | Biermann et al. ................... 106/456 |
| 4,631,089 | 12/1986 | Rademachers et al. ............ 106/456 |

*Primary Examiner*—Paul Lieberman
*Assistant Examiner*—Christine A. Skane
*Attorney, Agent, or Firm*—Connolly and Hutz

[57] ABSTRACT

Iron oxide black pigment with improved color intensity is produced by subjecting finely divided pigment obtained from reaction of metallic iron with aromatic nitro compounds to a heat treatment of 200° to 800° C. under a non-oxidizing atmosphere for a time of 2 minutes to 5 hours.

5 Claims, 2 Drawing Sheets

COLOR INTENSIVE IRON OXIDE BLACK PIGMENTS OBTAINED BY THE NITROBENZENE REDUCTION PROCESS AND A PROCESS FOR ITS PREPARATION This application is a continuation of application Ser. No. 059,492, filed Jun. 8, 1987, now abandoned.

The present invention relates to new, color-intensive, blue-tinged iron oxide black pigments obtained by the nitrobenzene reduction process and to an improved process for the preparation of iron oxide black pigments by the reaction of aromatic nitro compounds with metallic iron, optionally with the addition of control chemicals, to produce pigments consisting predominantly of $Fe_3O_4$.

BACKGROUND OF THE INVENTION

Iron oxide black pigments may be prepared by various processes. According to U.S. Pat. No. 4,173,624 and GB No. 15 349 53 those pigments may be prepared by the reaction of iron salts with alkalies. Once major disadvantage of this process is that it results in the formation of a quantity of neutral salts equivalent to the quantity of alkalies put into the process. The reductive calcination of iron compounds as disclosed in GB No. 1 575 337 has the disadvantage of forming calcination gases.

The reduction of FeOOH or $Fe_2O_3$ with reducting gases such as hydrogen at elevated temperatures has been described in U.S. Pat. No. 4,631,089. The produre required for dealing with hydrogen or combustible gases at elevated temperatures is, however, expensive.

The reaction of iron scrap in atmospheric oxygen in a slightly acid medium as described in U.S. Pat. No. 4,123,501 and has the disadvantage of low reaction velocities.

Lastly, the preparation of iron oxide pigments by the reaction of aromatic nitro compounds with iron to form aromatic amine by-products and iron oxide pigments is disclosed in DE-C 703 416, DE-C 551 255 and DE-C 518 929.

Yellow ($\alpha$-FeOOH), red ($\alpha$-Fe$_2$O$_3$) or black (Fe$_3$O$_4$) iron oxide pigments may be obtained, depending on the nature and quality of the iron used (granules, cast turnings) and on the control chemicals.

The starting material used for the production of iron oxide black pigments by the so-called nitrobenzene process are aromatic nitro compounds such as nitrobenzene and metallic iron. The metallic iron is in most cases iron turnings as this is the least expensive form of iron. The particle size is controlled by varying the process parameters, using control chemicals and suitable choice of the qualities of iron. Very finely divided pigments obtained by this process have, however, such a pronounced brown tinge that they cannot be used as iron oxide black pigments. These pigments have color value deviations of more than one unit in the $\Delta b^*$-value $\Delta(B^* \geq +1)$, based on the Trade product Bayferrox 320.

No color intensive iron oxide pigments which are neutral or blue tinged in color of the kind preferred by the lacquer and building industry have heretofore been obtained by the nitrobenzene reduction process.

It is therefore an object of the present invention. to provide an iron oxide black pigment produced by the nitrobenzene reduction process which does not have the disadvantages described above and therefore fulfils the requirements of a black pigment.

These requirements are fulfilled by the iron black pigments according to this invention.

BRIEF DESCRIPTION OF THE INVENTION

The present invention produces improved iron oxide black pigments which have a blue tinge but do not have the objectionable brown tinge of pigments produced by the known nitrobenzene process. The improved pigments, which are also a part of the present invention, are produced from conventional iron oxide black pigments obtained by the nitrobenzene reduction process by a tempering or heating of such pigments at an elevated temperature for a period of time sufficient to remove the objectionable brown tinge.

The present invention relates to iron oxide black pigments obtained by the nitrobenzene reduction process, having a crystallite size of less than 80 nm and a relative color intensity of more than 150%, preferably 200 to 250%, with a blue tinge of $\Delta b^* = \pm 0$ to $-2.0$ units, based on ®Bayferrox 320.

Figure 1:
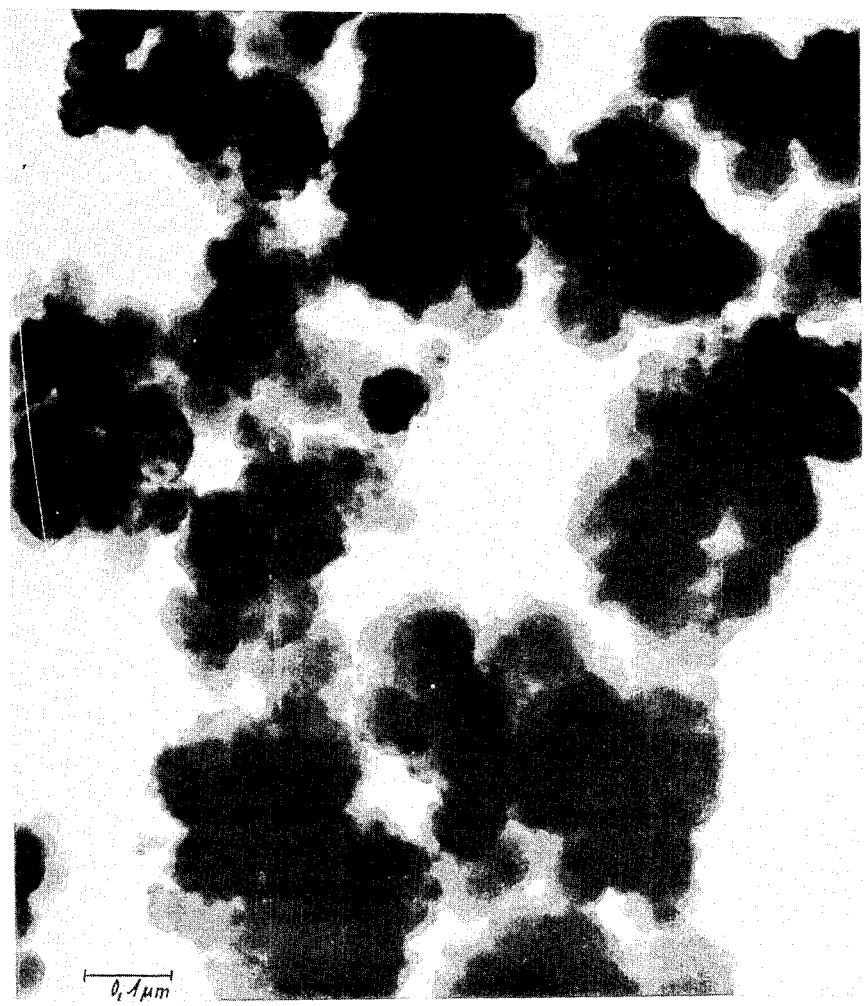
FIG. 1 is a photo micrograph of a conventional iron oxide black pigments obtained from the nitrobenzene reduction process.
Figure 2:
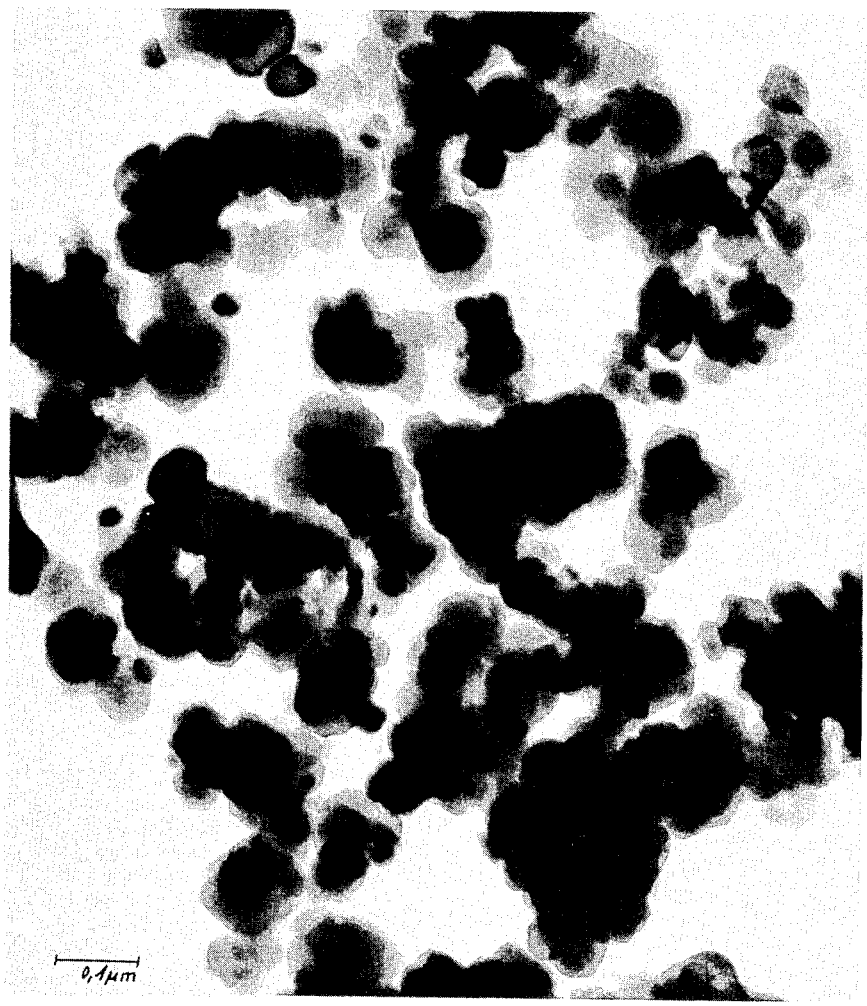
FIG. 2 is a photo micrograph of pigments according to the present invention.

The iron oxide black pigments according to the invention are readily dispersible and attain their final color intensity even without additional grinding. The ®Bayferrox 320 used for comparison is an iron oxide black pigment produced by the nitrobenzene reduction process and having an iron content of 92 to 95%, calculated as $Fe_2O_3$. ®Bayferrox 320 is a Trade product of Bayer AG. The iron oxide black pigments normally produced by the nitrobenzene reduction process can be recognized under electron microscopic magnification by their irregular, clefted surface as shown in FIG. 1. The products according to the present invention, on the other hand, have smooth pigment surfaces as shown in FIG. 2. Due to the starting materials used in nitrobenzene reduction process ($SiO_2$-containing scrap or iron turnings), all the pigments have an $SiO_2$ content of more than 1%.

It is surprisingly found that the iron oxide black pigments according to this invention may be obtained quite simply by subjecting finely divided iron oxide black pigments produced by the nitrobenzene reduction process to a heat treatment at an elevated temperature.

The present invention thus relates to a process for the preparation of iron oxide black pigments by the reaction of aromatic nitro compounds with metallic iron, optionally with the addition of control chemicals, to produce finely divided pigments which are predominantly $Fe_3O_4$, characterised in that the finely divided pigments thus prepared are subjected to a temperature treatment at 200° C. to 800° C. in a non-oxidizing atmosphere.

The temperature treatment is most preferably carried out at 400° C. to 750° C. Especially good results are obtained if the non-oxidizing atmosphere contains steam. It has been found that the dwell time for the temperature treatment is advantageously 2 minutes for 5 hours.

The process according to the invention may advantegeously be carried out on any iron oxide black pigments which have been obtained by the nitrobenzene reduction process. An exceptionally great improvement in the intensity of the color is obtained, however, when the process according to the invention is carried out on a product containing predominantly $Fe_3O_4$ which is not ordinarily suitable as black pigment due to its brown tinge.

The non-oxidizing atmosphere used in the present invention can be any gas which will not oxidize the iron oxide pigment. Suitable gases include steam or water vapor, nitrogen, argon, and soforth.

It has been found particularly advantageous to carry out the process according to the invention continously in a rotary tubular furnace.

The process according to the invention is generally carried out as follows:

A finely divided, brown tinged $Fe_3O_4$ pigment is introduced either ground or unground and either dried or as a moist filter cake into a rotary convertor furnace and heated to over 400° C. under a protective furnace gas such as $N_2$, Ar, or $H_2O$, and then cooled to below 100° C. This process may be followed by the usual methods for stabilizing iron oxide black pigments as described, for example, in U.S. Pat. No. 4,082,905 or U.S. Pat. No. 4,491,619.

The pigments should be cooled under the protective gas to temperatures below 100° C. after the temperature treatment in order to prevent any deterioration in their optical properties due to oxidation.

All $Fe_3O_4$ pigments produced by the nitrobenzene reduction process are suitable for the process according to the invention and the quality of their color is improved by the process. The pigments may be put into the process either as pigment pastes (solids content 60–70%) or as dried, unground pigments or as dried, ground pigments.

The invention will now be illustrated by Examples but is not limited by them.

EXAMPLES 1 to 4

500 g of each of the iron oxide pigments known under the Trade names of ®Bayferrox 306, 316, 318 and 320 obtained by the nitrobenzene process (according to DE-C 551 255) were heated to 500° C. in a laboratory rotary convertor furnace in an atmosphere of 250 l of $N_2$/h which had been saturated with water vapor at room temperature, and the pigment was kept at 500° C. for 2 hours. After cooling to a temperature below 100° C., the color values were determined on a white blend (mixture of the black pigment with a commercial $TiO_2$ white pigment in proportions by weight of 1:5) according to ISO 7224-2 and the results were converted to CIELAB 2/d values according to ISO 7724-3 and compared with that of the Trade product of Bayer AG ® Bayferrox 320 in ®Alkydal F 48 lacquer (Trade product of Bayer AG). Negative $\Delta b^*$ values denote a blue tinge.

All pigments were ground in a vibratory ball mill (model Mikrodismembrator II or B. Braun) for 30 seconds unless otherwise indicated.

The changes in color values of commercial types of ®Bayferrox are summarized in Table 1.

TABLE 1

| | | Color Values | | | |
|---|---|---|---|---|---|
| | | before tempering | | after tempering | |
| Example No. | Product | relative color intensity % | color tinge $\Delta b^*$ | relative color intensity % | color tinge $\Delta b^*$ |
| 1 | ® Bayferrox 306 | 68 | −1.8 | 87 | −1.9 |
| 2 | ® Bayferrox 316 | 89 | −1.3 | 105 | −1.7 |
| 3 | ® Bayferrox 318 | 93 | −0.3 | 117 | −1.1 |
| 4 | ® Bayferrox 320 | 100 | ±0 | 135 | −0.8 |

EXAMPLES 5–8

Exceptionally finely divided black pigments with a pronounced brown tinge were tempered at 700° C. for 30 minutes as described in Examples 1 to 4. The increase in relative color intensity and the increase in blue tinge are summarized in Table 2 together with other pigment properties. ®Bayferrox 320 is used as reference.

The specific surface area was determined by the BET method using nitrogen. The mean crystallite size was determined radiographically from the integral line width of a diffraction reflex.

TABLE 2

| Example No. | Product | relative color intensity (%) | color tinge $\Delta b^*$ | Crystallite size nm | Specific surface area $m^2/g$ | $Fe^{3+/2+}$ |
|---|---|---|---|---|---|---|
| 5 | finely divided $Fe_3O_4$ | 185 | +1.3 | 61.5 | 16.4 | 2.93 |
| 6 | finely divided $Fe_3O_4$ tempered | 208 | −0.4 | 68.5 | 13.0 | 2.08 |
| 7 | very finely divided $Fe_3O_4$ | 213 | +2.8 | 50.5 | 26.0 | 3.21 |
| 8 | very finely divided $Fe_3O_4$ tempered | 246 | −0.1 | 54.5 | 19.8 | 2.01 |
| Reference | ® Bayferrox 320 | 100 | 0 | 66.0 | 11.1 | 2.41 |

EXAMPLE 9

The effect of dwell time is shown in Table 3.

TABLE 3

| Example No. | Dwell time (500° C.) h | Relative color intensity % | color tinge Δb* | Crystallite size nm | Specific Surface area m²/g | $Fe^{3+/2+}$ |
|---|---|---|---|---|---|---|
| 9 a | 0 | 185 | +1.3 | 61.5 | 16.4 | 2.93 |
| 9 b | 0.25 | 195 | −0.2 | 61.5 | 22.0 | 2.10 |
| 9 c | 0.5 | 208 | −0.4 | 67.0 | 21.0 | 2.08 |
| 9 d | 3 | 193 | −0.5 | 69.0 | 19.4 | 2.09 |
| 9 e | 9 | 185 | −0.5 | 71.0 | 18.6 | 2.05 |

EXAMPLE 10

Table 4 shows the influence of temperature.

TABLE 4

| Example No. | Temperature (30 min.) °C. | Relative color intensity % | color tinge Δb* | Crystalline size nm | Specific surface area m²/g | $Fe^{3+/2+}$ |
|---|---|---|---|---|---|---|
| 10 a | 150 | 213 | +2.8 | 50.5 | 26 | 3.21 |
| 10 b | 200 | 219 | +2.7 | 51.0 | 27 | 3.17 |
| 10 c | 400 | 232 | +1.5 | 53.2 | 27 | 2.52 |
| 10 d | 700 | 246 | −0.1 | 54.5 | 19.8 | 2.01 |
| 10 e | 900 | 12 | +1.1 | 55.5 | 5.1 | 2.02 |

EXAMPLE 11 and 12

Table 5 shows the excellent dispersion properties of the tempered samples.

TABLE 5

| Example No. | Product | Measures before tempering | Measures after tempering | Relative color intensity % | color tinge Δb* |
|---|---|---|---|---|---|
| 11 a | very finely divided $Fe_3O_4$ | dried | ground | 246 | −0.1 |
| 11 b | very finely divided $Fe_3O_4$ | dried | not ground | 243 | −0.1 |
| 12 a | very finely divided $Fe_3O_4$ | as paste (60% solids content) | not ground | 221 | ±0 |
| 12 b | very finely divided $Fe_3O_4$ | as paste (60% solids content) | ground | 233 | ±0 |

It is both surprising and advantageous to find that almost identical color values are obtained in Examples 11 b and 12 c even though the samples were not ground after tempering.

What is claimed is:

1. In the process for preparation of improved iron oxide black pigments by the reaction of aromatic nitro compounds with metallic iron of form finely divided pigment which is predominantly $Fe_3O_4$, the improvement comprising heating the finely divided uncoated $Fe_3O_4$ pigment to a temperature of 400° C. to 750° C. under a non oxidizing atmosphere.

2. Process according to claim 1 wherein the non-oxidizing atmosphere contains water vapor.

3. Process according to claim 1 wherein the finely divided pigment is heated from 2 minutes to 5 hours.

4. Process according to claim 1 wherein the heating is carried out continuously in a rotary tubular furnace.

5. Process according to claim 1 wherein after heating the pigment is cooled to below 100° C. while still under the non-oxidizing atmosphere.

* * * * *